United States Patent [19]
Jain et al.

[11] Patent Number: 5,400,678
[45] Date of Patent: Mar. 28, 1995

[54] LINE PRESSURE OPTIMIZATION IN AN AUTOMATIC TRANSMISSION

[75] Inventors: Pramod K. Jain, Farmington Hills; Andrew Paredes, Northville, both of Mich.

[73] Assignee: Ford Motor Company, Dearborn, Mich.

[21] Appl. No.: 968,907

[22] Filed: Oct. 30, 1992

[51] Int. Cl.⁶ ............................................. B60K 41/06
[52] U.S. Cl. .................................... 477/115; 192/3.58; 477/120; 477/127; 477/128; 477/129
[58] Field of Search ................. 74/866, 867; 192/0.32, 192/3.58

[56] References Cited
U.S. PATENT DOCUMENTS

| | | | |
|---|---|---|---|
| 4,503,734 | 3/1985 | Acker | 74/866 X |
| 4,529,072 | 7/1985 | Oguma et al. | 192/3.58 X |
| 4,795,011 | 1/1989 | Ushijima et al. | 192/3.58 X |
| 4,805,750 | 2/1989 | Nitz | 192/3.58 |
| 4,831,899 | 5/1989 | Honig | 74/867 OR |
| 4,875,391 | 10/1989 | Leising et al. | 74/866 OR |
| 4,958,538 | 9/1990 | Yamashita et al. | 74/866 |
| 4,972,738 | 11/1990 | Narita | 74/866 |
| 5,082,097 | 1/1992 | Goeckner et al. | 192/32 |
| 5,086,669 | 2/1992 | Fujiwara et al. | 74/866 |
| 5,111,718 | 5/1992 | Iizuka | 74/866 |

*Primary Examiner*—Rodney H. Bonck
*Assistant Examiner*—Daniel Wittels
*Attorney, Agent, or Firm*—Roger L. May; Frank G. McKenzie

[57] ABSTRACT

A method is provided for use in a vehicle including an automatic transmission having at least one load carrying friction element, such as clutch, of optimizing the line pressure in the transmission by slipping the weakest friction element by a small amount. The method includes the steps of decreasing the line pressure from a predetermined base pressure to allow for incipient slip across the weakest friction element and then increasing the line pressure to obtain a temporary pressure at which the weakest friction element is no longer slipping. The method also includes the step of further increasing the line pressure from the temporary pressure to obtain an operating line pressure. Preferably, the operating line pressure provides the weakest friction element with additional capacity for transmitting torque without slip for normal driving conditions, i.e. sensed vehicle throttle positions within a predetermined hysteresis band.

16 Claims, 6 Drawing Sheets

LINE PRESSURE OPTIMIZATION IN AN AUTOMATIC TRANSMISSION

TECHNICAL FIELD

The present invention relates to controlling line pressure in an automatic transmission and, more particularly, to optimizing line pressure so as to improve transmission efficiency.

BACKGROUND ART

Automatic transmissions for motor vehicles typically include a plurality of torque transmitting devices, commonly referred to as clutches. The line pressure of the transmission is controlled according to a pressure schedule to selectively engage these clutches so as to establish different gear ratios between the input shaft and the output shaft of the transmission. A line pressure which prevents clutch slippage is utilized, since clutch slippage reduces the torque transmitted and generates heat. Although clutch slippage is prevented, typically the line pressure utilized imparts excess torque capacity. This results in higher than necessary line pressure, increasing pumping losses and reducing overall transmission efficiency. It would therefore be desirable to control the transmission line pressure to the minimum required, or optimal, value, thereby maximizing efficiency.

Various attempts have been made at automatic transmission line pressure control. For example, U.S. Pat. No. 4,805,750, issued to Nitz, discloses a steady-state slip detection/correction for a motor vehicle transmission. When significant clutch slippage is detected, line pressure is adjusted upward to increase the torque capacity of a clutch. If significant slippage is not detected over a period of specified driving cycles, the pressure is adjusted downward to decrease the torque capacity of the clutch, resulting in a low frequency clutch pressure limit cycle, enhancing the transmission efficiency while maintaining clutch slippage within acceptable limits. The presence of significant clutch slippage is detected by a routine which generates an accumulative indication of the slippage between input and output shafts of the transmission. If excessive slippage continues after the pressure has been increased, a clutch or gear failure is indicated and the transmission shift points are adjusted to reflect the loss of that gear.

Following the teachings of the Nitz reference, slip correction does not occur until after significant, unacceptable clutch slippage occurs. This methodology has inherent disadvantages since significant clutch slippage reduces transmission efficiency and degrades the durability of the clutch element.

Other U.S. Patents relating generally to controlling transmission line pressure include U.S. Pat. No. 4,958,538, issued to Yamashita et al., No. 4,972,738, issued to Narita, No. 5,082,097, issued to Goeckner et al., No. 5,086,669, issued to Fujiwara et al. and No. 5,111,718, issued to Iizuka.

SUMMARY OF THE INVENTION

It is an object of the present invention to provide an improved method of controlling the line pressure of an automatic transmission.

It is a further object of the present invention to provide an improved method of controlling the line pressure of an automatic transmission to reduce line pressure to the minimum required value, reducing pumping losses and improving transmission efficiency.

In carrying out the above objects and other objects and features of the present invention, a method is provided, for use in a vehicle having a driveline including an automatic transmission having a plurality of load carrying friction elements, of optimizing the line pressure in the transmission. The method comprises (a) decreasing the line pressure from a predetermined base pressure to allow for incipient slip across the weakest load carrying friction element. The method also comprises (b) increasing the line pressure to obtain a temporary pressure at which the weakest load carrying friction element is no longer slipping and (c) increasing the line pressure from the temporary pressure to obtain an operating line pressure. The operating line pressure provides the weakest load carrying friction element with additional capacity for transmitting torque. Most preferably, the operating line pressure provides additional capacity for transmitting torque without friction element slippage for throttle position changes within a predetermined hysteresis band. The method also comprises (d) sensing driveline torque transients and repeating steps (a)–(d) during vehicle operation following detection of a transient.

The advantages accruing to the present invention are numerous. For example, the method of the present invention results in reduced transmission pumping losses, thereby improving overall transmission efficiency with no loss in perceived smoothness.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
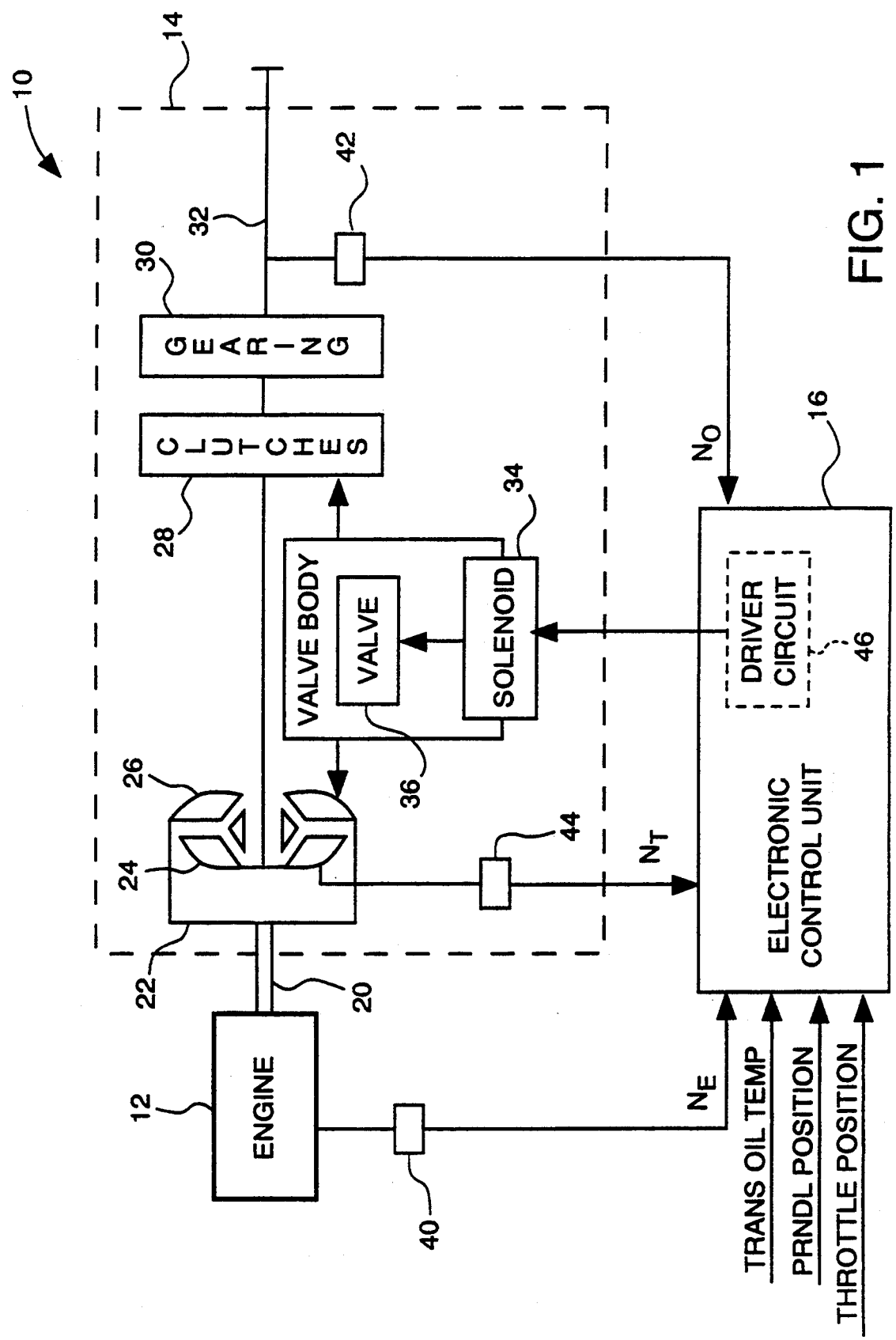
FIG. 1 is a block diagram of the vehicle drivetrain system for carrying out the line pressure optimization method of the present invention.

Referring now to FIG. 1, there is illustrated a block diagram of a system, shown generally by reference numeral 10, for carrying out the line pressure optimization method of the present invention. As illustrated, the system 10 includes an internal combustion engine 12, an automatic transmission 14 and an electronic control unit (ECU) 16. The transmission 14 transmits the torque generated by the engine through the transmission 14 to drive axles not specifically illustrated. The torque flow originates at the engine output shaft 20 and flows through a torque converter 22, a plurality of clutches shown generally by reference numeral 28, and gearing shown generally by reference numeral 30, to the transmission output shaft 32, which is mechanically coupled to the drive axle.

With continuing reference to FIG. 1, the impeller 26 of the torque converter 22 is rotatably driven by the output shaft 20. The turbine 24 of the torque converter 22 is rotatably driven by the impeller 26 by means of a known fluid transfer therebetween. In turn, the turbine 24 rotatably drives the transmission input shaft. The clutches 28 are fluid-operated, load carrying friction elements which can be applied or released according to a transmission line pressure strategy for establishing different ratios of the gearing 30 and for establishing torque flow paths through the gearing 30.

In the preferred embodiment, the ECU 16 executes the line pressure strategy based on a plurality of vehicle operating parameters. As shown in FIG. 1, these vehicle operating parameters include transmission oil temperature, shift lever (i.e. PRNDL) position and throttle position. Additionally, speed sensors 40, 42 and 44 provide engine speed ($N_E$), transmission output shaft ($N_O$) and turbine speed ($N_T$) information, respectively, to the ECU 16. As described in greater detail below, the ECU 16 utilizes these vehicle operating parameters to determine a control signal which is utilized by the standard drive circuitry shown generally by reference numeral 46 to obtain an electric current for energizing a solenoid 34. The solenoid 34 could be, for example, a variable force solenoid (VFS) energized according to a percent (%) current control signal, or a pulse-width modulated (PWM) solenoid energized according to a duty cycle control signal. The solenoid 34 controls a line pressure regulator valve 36 which, in turn, regulates the transmission line pressure.

Figure 2:
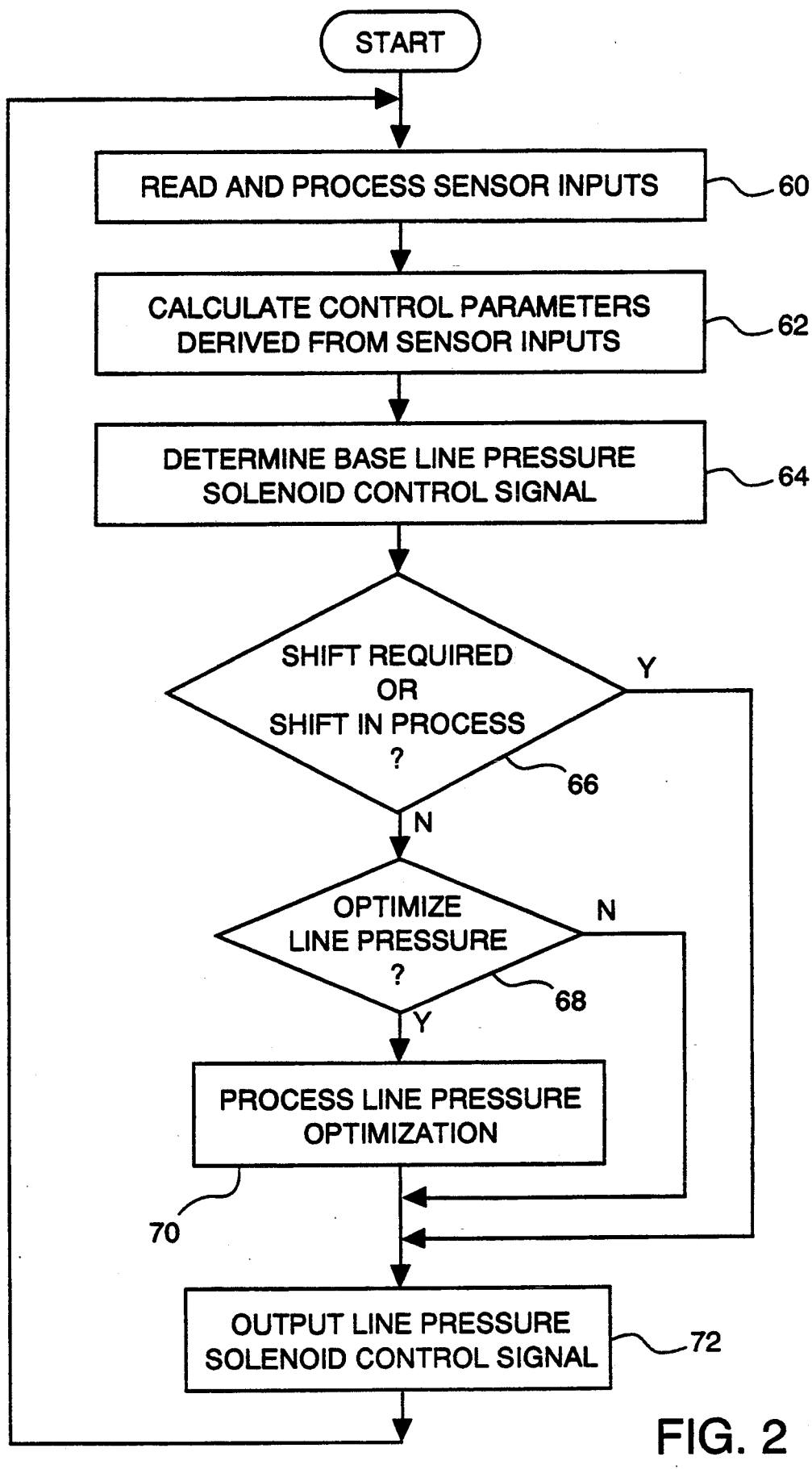
FIG. 2 is a flow chart illustrating the steps of the line pressure optimization method of the present invention.

Referring now to FIG. 2, there is shown a flow chart detailing the steps for line pressure optimization of the present invention. This strategy is executed periodically (e.g. every loop) during vehicle operation. At step 60, the ECU 16 reads and processes data from sensors. As previously mentioned, this data includes engine speed, transmission output speed and torque converter turbine speed utilizing sensors 40, 42 and 44, respectively, shown in FIG. 1. This data also includes transmission oil temperature, shift lever position and throttle position utilizing sensors not specifically illustrated. The processing of the raw data collected from the sensors may of course include signal conditioning, such as filtering and conversions to appropriate engineering units.

At step 62, the ECU 16 calculates various control parameters based on the sensor data. In the preferred embodiment, these control parameters include vehicle speed, calculated turbine speed, transmission input torque, clutch slip and current gear. The vehicle speed is determined by multiplying the transmission output shaft speed by a predetermined conversion constant. Similarly, the calculated turbine speed is determined by multiplying the transmission output shaft speed by the current gear ratio and a conversion constant. The transmission input torque can be determined from an engine torque map utilizing throttle position and engine speed. Such a torque map could be stored in the keep-alive memory (KAM) of the ECU 16. The KAM is a type of non-volatile memory that retains its contents even when the vehicle is not being operated. Alternatively, the transmission input torque is determined utilizing calculated engine torque. The clutch slip is determined as the difference between measured turbine speed and calculated turbine speed. Lastly, the current gear is derived from the ratio of turbine speed to output shaft speed.

With continuing reference to FIG. 2, at step 64 the ECU 16 determines the base line pressure solenoid control signal. In the preferred embodiment, with the transmission in a forward or reverse gear the base line pressure is a function of transmission input torque and current gear. Transmission input torque can be determined based on engine torque, which can be obtained either from a calibrated torque map based on the vehicle engine as a function of throttle position and engine speed, or calculated from engine control parameters. Once engine torque is obtained, transmission input torque can then be calculated by applying a torque converter characteristic curve to the above value of engine torque.

For each gear, base line pressure is preferably determined from a function based on transmission input torque. The function for each gear represents the line pressure required to hold the weakest load carrying friction element, including a safety factor of approximately 10%. The weakest friction element is the friction element which requires the highest pressure to hold the transmission in a gear. The line pressure required to hold the weakest element is clipped to a minimum value and becomes the base line pressure.

Utilizing the base line pressure ($P_{BASE}$), a commanded solenoid pressure is determined utilizing a suitable transfer function. For a VFS solenoid, a commanded VFS pressure ($P_{VFS}$) is determined utilizing the following transfer function:

$$P_{VFS} = P_{BASE} * V_S + V_{INT}$$

wherein $V_S$ and $V_{INT}$ are calibratable values based on the design features of the regulator valve 36, representing the slope and intercept of the line pressure versus the VFS pressure relationship. A similar suitable transfer function could be utilized for a PWM solenoid.

Commanded VFS solenoid pressure is provided as an input to a function which determines a VFS solenoid percent current control signal. As previously stated, if a PWM solenoid is utilized, an appropriate duty cycle solenoid control signal would be generated. Driver circuitry 46 in the ECU 16 converts the control signal to an electric current signal, which energizes the VFS solenoid 34. The electric current operates the solenoid, creating hydraulic pressure which modulates existing transmission line pressure to realize the commanded VFS pressure. The commanded VFS pressure is then applied to the line pressure regulator valve 36, the output of which is the line pressure.

As shown in FIG. 2, prior to the initiation of line pressure optimization, at step 66 the ECU 16 then determines whether vehicle operation requires a transmission shift, or whether a transmission shift is already in progress. If a shift is required or a shift is in progress, control flow jumps to step 72, and the base line pressure solenoid control signal is output to the solenoid 34 through the driver circuitry 46.

If the transmission shift conditions are not satisfied, at step 68 the ECU determines whether or not to initiate the line pressure optimization strategy of the present invention. In the preferred embodiment, certain other conditions are preferably satisfied prior to line pressure optimization. For example, if there has been a ratio change, the transmission line pressure remains at the base line pressure for a short interval of time, such as a half a second. This ensures steady state operation of the torque converter and the clutches. Additionally, transmission oil temperature should be within a predetermined normal operating range. The rate of change of throttle position is also monitored and compared to predetermined calibration constants stored in the ROM memory of the ECU 16. Line pressure optimization is preferably not initiated if the rate of change is fluctuating rapidly, since rapid variations in the throttle position change indicate varying vehicle operating requirements, which typically result in line pressure oscillations. If these conditions are satisfied at step 68, the line pressure optimization strategy is initiated at step 70 by the ECU 16.

Figure 3A:
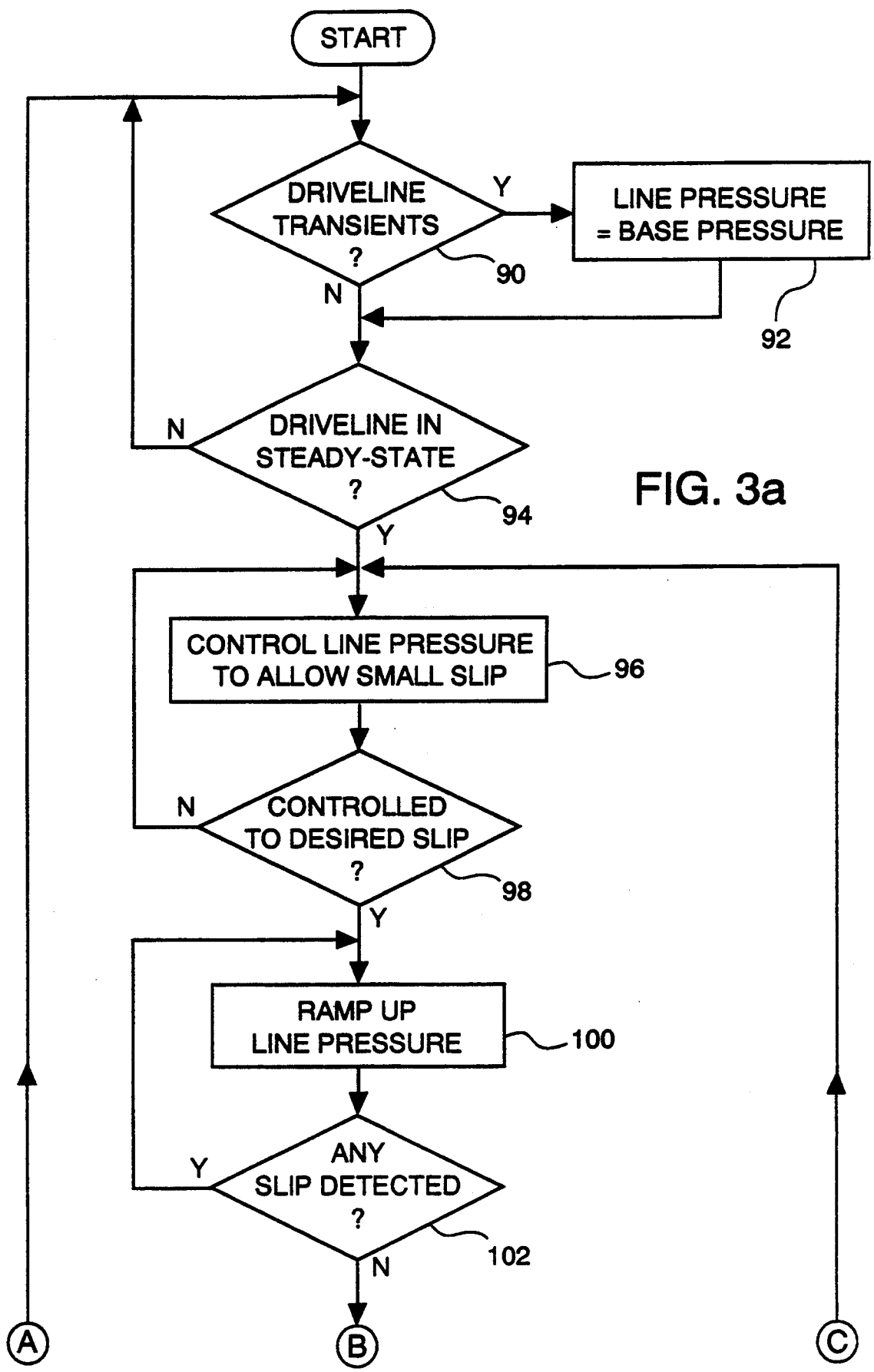
FIGS. 3a and 3b are flow charts illustrating the steps of the line pressure optimization subroutine.
Figure 3B:
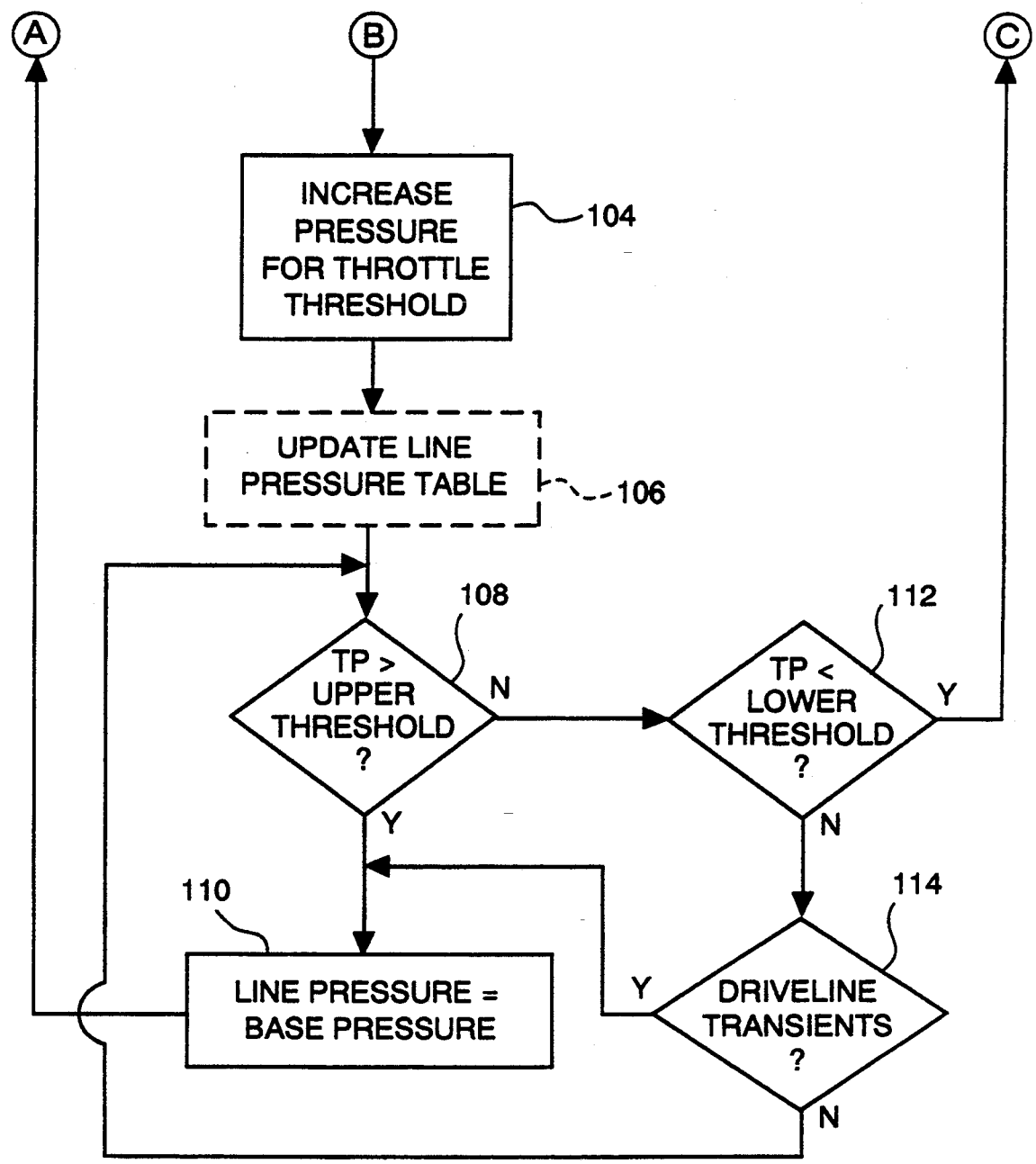

Referring now to FIGS. 3a–3b, a flow chart is shown illustrating the steps of line pressure optimization according to the present invention. At step 90, the ECU determines whether there has been a driveline transient, such as a transmission gear shift. If so, the transmission line pressure is controlled to the base line pressure at step 92, as previously described with respect to step 64 of FIG. 2.

Figure 4:
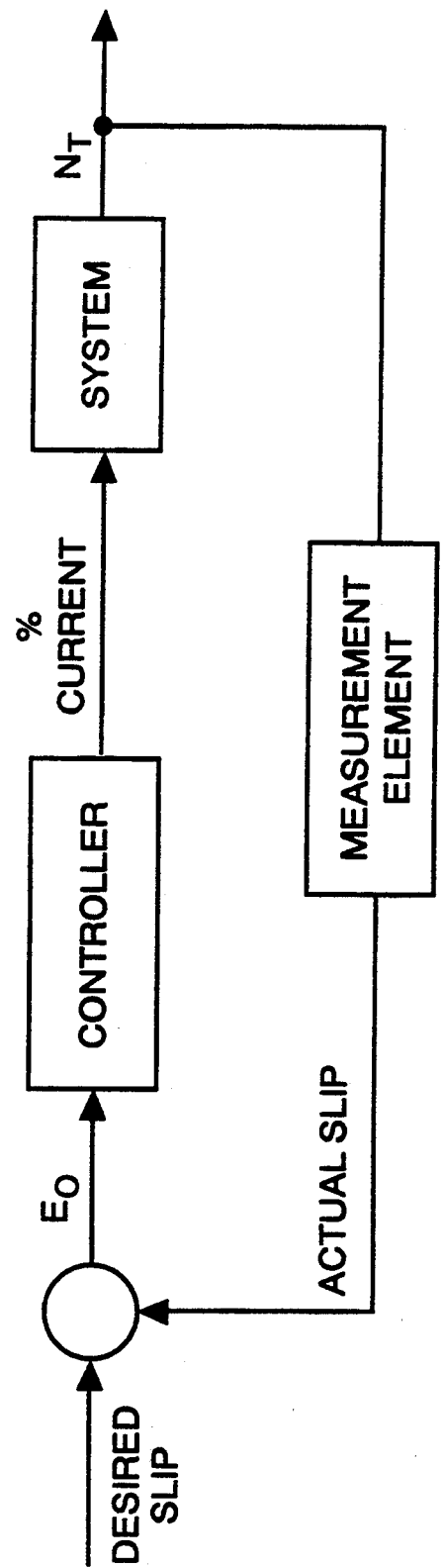
FIG. 4 is a block diagram of the closed-loop, proportional, integral, differential (PID) control for achieving desired clutch slip according to the present invention.

As best shown in FIG. 3a, at step 94 the ECU 16 determines if a steady-state operating condition exists. During steady-state conditions, the line pressure and the VFS percent current will be constant. When a steady-state condition does exist, the ECU 16 controls the solenoid 34 at step 96 with a closed-loop proportional, integral, differential (PID) controller, gradually lowering the line pressure to a value where there is a small slip on the weakest load carrying friction element. In the preferred embodiment, this small slip is about $\frac{1}{2}$% of the turbine speed, or about 10 RPM. It should be appreciated that the value is dependent on the transmission utilized and that the small slip could be from 5 RPM to 20 RPM. This small amount of slip will not result in degradation of the friction element durability. FIG. 4 is a block diagram of the closed-loop PID control utilized for achieving the desired clutch slip. The desired slip is shown graphically in FIG. 5.

Figure 5:
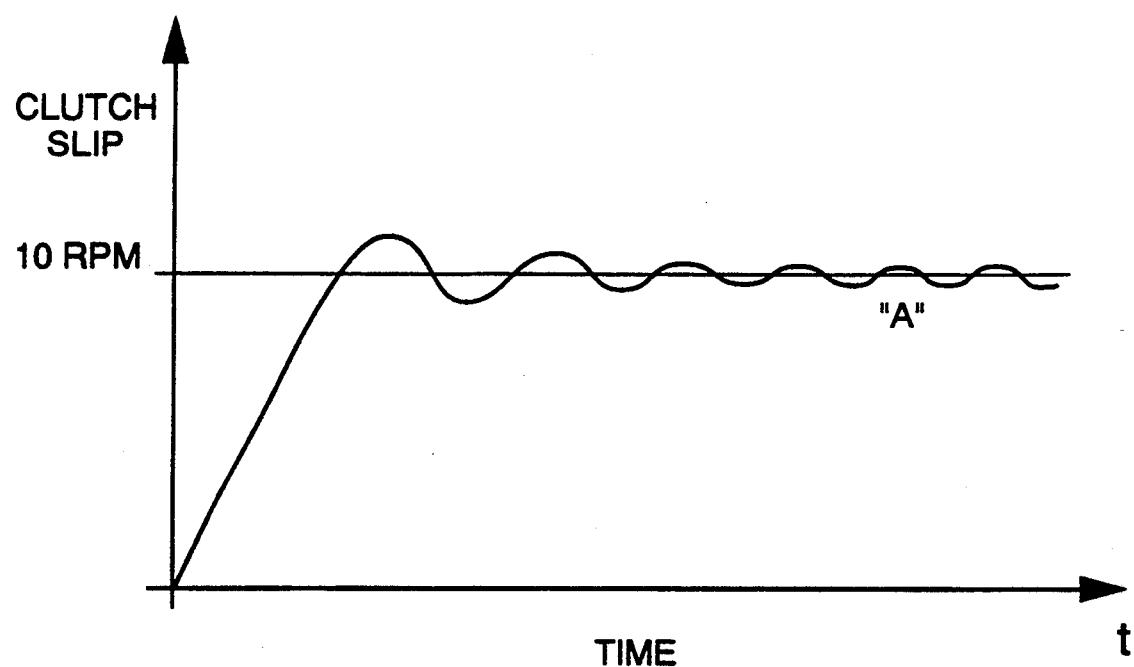
FIG. 5 is a graphical representation of determination of a small amount of clutch slip.

Referring once again to FIG. 3a, at step 98 the ECU 16 determines whether the desired slip, shown at about point "A" on FIG. 5, has been attained. If it has been attained, the desired turbine speed can be determined using the output shaft speed data from sensor 42 and the known current gear. The desired turbine speed can then be compared to the actual turbine speed as measured by the sensor 44. If the measured turbine speed is greater than the desired turbine speed, the ECU infers that the weakest load carrying friction element associated with the current gear is slipping by a small amount.

With additional reference to FIG. 4, initially, the ECU 16 determines the present friction element slip error ($E_0$) as follows:

$$E_O = SLIP_{DES} - SLIP_{ACT}$$

wherein $SLIP_{DES}$ represents the desired slip and $SLIP_{ACT}$ represents the actual slip. Next, the ECU determines the control signal, $PC_N$, (i.e. percent current for a VFS solenoid) to achieve and maintain the desired slip:

$$PC_n = PC_p + (E_o - E_1)^* K_p + (E_o - 2^* E_1 + E_2)^* K_d + E_o^* K_i$$

wherein $PC_p$ is the previous loop control signal, $E_1$ is the previous loop slip error, $E_2$ is the second previous loop slip error, and $K_p$, $K_i$ and $K_d$ are proportional, integral and differential controller constants, respectively.

It is generally not desirable to continually operate the transmission while a friction element is slipping even a small amount because the transmission is not operating at peak efficiency. Therefore, at step 100, the solenoid 34 is controlled by the ECU and the line pressure is ramped up slowly to a temporary line pressure. In the preferred embodiment, the temporary line pressure is a line pressure at which there is no slip detected by the ECU across the weakest friction element.

With reference now to FIGS. 3a–3b, when a no-slip condition is detected at step 102, the line pressure is increased from the temporary pressure to an operating line pressure at step 104. The operating line pressure preferably provides additional torque transmitting capacity, maintaining a no-slip condition during normal throttle variations. Most preferably, the operating line pressure maintains a no-slip condition for changes in throttle position that are within a predefined hysteresis band. The hysteresis band is defined by an upper threshold and a lower threshold, each of which represents about a 2% change (i.e. increase/decrease) in throttle position. As long as throttle position is not changed more than ±2%, the line pressure is held constant by keeping the VFS percent current constant. Thus, the methodology of the present invention allows a reduction in the safety margin from the typical 10% to about 2%.

Figure 6:
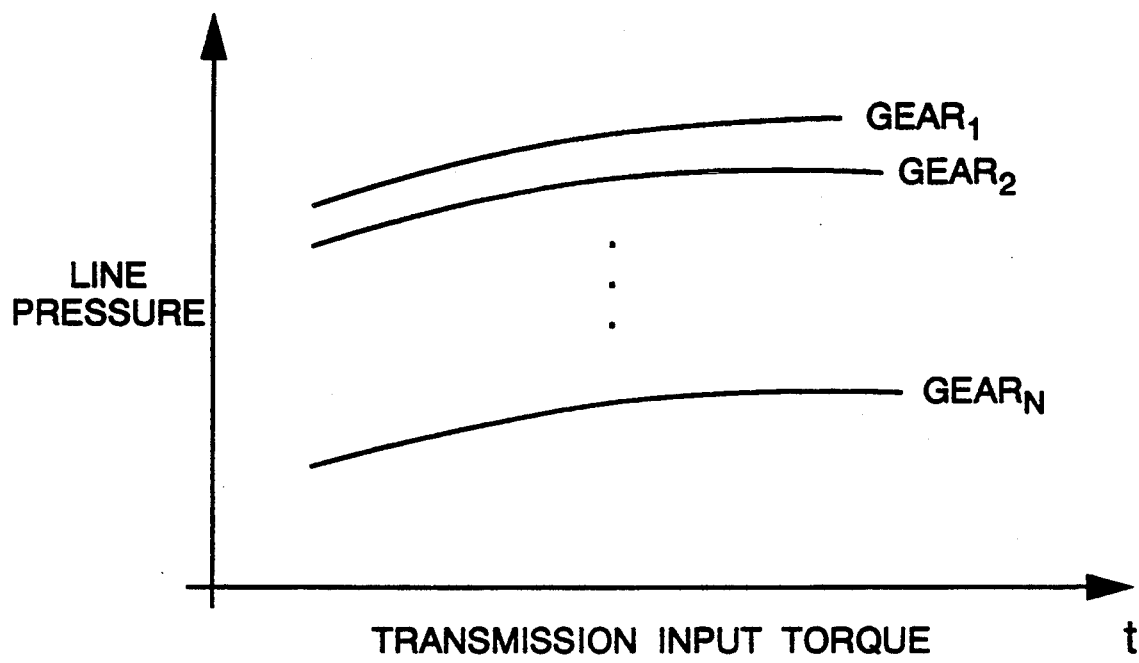
FIG. 6 is a graphical representation of a family of curves from which a table of line pressures is obtained, the table values being modified adaptively according to one aspect of the present invention.

In one embodiment, the line pressure could be adaptively increased at step 104 utilizing a table of line pressure values stored in the KAM of the ECU, The table values are based on the current gear and the transmission input torque, and are obtained from a family of curves shown graphically in FIG. 6. Alternatively, the table values could be based on current gear and throttle position. The table values represent the lowest line pressure required to maintain a no-slip condition in a particular gear at a particular transmission input torque and are updated as the vehicle is operated. Since the table is maintained in the KAM, the contents of the table are preserved even while the vehicle is not being operated. As a result, efficient transmission control is ensured, even as the tolerances of the transmission components change from wear. The table values could also include a built in safety margin.

The throttle position is monitored at step 108 to determine if it has increased above the upper threshold of the hysteresis band. If the upper threshold has been exceeded, the ECU modifies the solenoid control signal at step 110 to the control signal determined at step 64, increasing the line pressure from the operating line pressure to the base line pressure, to ensure the weakest friction element is not slipping. Alternatively, the line pressure could be increased at step 110 to a higher pressure obtained from a calibrated torque map stored in the KAM or calculated from engine control parameters. The torque map could be based on the vehicle engine torque as a function of throttle position and engine speed. From engine torque, transmission input torque and line pressure can be obtained, as previously described. Control flow then returns to the beginning of the optimization subroutine, which is repeated as previously described.

With continuing reference to FIGS. 3a and 3b, if the throttle position has not exceeded the upper threshold, at step 112 the ECU determines if the throttle position has changed to a value below the lower threshold of the hysteresis band. If the throttle position has so decreased, there is excess torque transmitting capacity and a no-slip condition can be maintained at a lower line pressure. Control flow jumps to step 96, and the line pressure is gradually lowered to a value at which there is a small slip. The remainder of the optimization subroutine is then repeated as previously described, increasing the overall efficiency of the transmission.

If the throttle position has not dropped below the lower threshold, the ECU determines whether there are any driveline transients. If so, control flow jumps back to step 110, and the line pressure is increased to the base line pressure, to ensure the weakest friction element is not slipping. If there are no transients, control flow jumps back to step 108, and the throttle position loop is repeated.

Thus, the line pressure optimization scheme of the present invention dynamically controls the line pressure to the smallest value for maintaining a no-slip condition across the load carrying friction elements. This strategy results in lower line pressure, thereby reducing pumping losses and increasing the overall efficiency of the transmission.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method, for use in a vehicle having a driveline including an automatic transmission with a plurality of load carrying friction elements, of optimizing a line pressure in the automatic transmission, the method comprising:
    (a) decreasing the line pressure from a predetermined base pressure to allow for a small slip within a predetermined range across a weakest load carrying friction element;
    (b) increasing the line pressure to obtain a temporary pressure at which the weakest load carrying friction element is no longer slipping;
    (c) increasing the line pressure from the temporary pressure to obtain an operating line pressure, the operating line pressure providing the weakest load carrying friction element with additional capacity for transmitting torque without slipping during changes in vehicle throttle position within a predefined hysteresis band having an upper threshold and a lower threshold;
    (d) sensing driveline torque transients; and
    (e) repeating steps (a)–(d) during vehicle operation following detection of a transient.

2. The method of claim 1 further comprising increasing the line pressure, if the throttle position exceeds the upper limit of the hysteresis band to a new line pressure at which the weakest load carrying friction element is not slipping.

3. The method of claim 2 further comprising decreasing the line pressure from the new line pressure to allow for a small slip within a predetermined range across the weakest load carrying friction element.

4. The method of claim 2 wherein the line pressure is adaptively increased to the new line pressure, the new line pressure being based on vehicle throttle position and transmission input torque.

5. The method of claim 1 wherein the step of decreasing the line pressure to allow for small slip includes the step of controlling a solenoid according to:

$$PC_n = PC_p + (E_o - E_1)*K_p + (E_o - 2*E_1 + E_2)*K_d + E_o*K_i$$

wherein $PC_n$ is the solenoid control signal, $PC_p$ represents a previous value of the solenoid control signal, $E_0$ is the present friction element slip error determined from a desired friction element slip and the actual friction element slip, $E_1$ is the previous friction element slip error, $E_2$ is the second previous friction element slip error and $K_p$, $K_i$ and $K_d$ are controller constants.

6. A method, for use in a vehicle including a control unit and an automatic transmission having a plurality of load carrying friction elements, of optimizing a line pressure in the automatic transmission, the method comprising:
    (a) sensing a plurality of vehicle operating parameters including vehicle throttle position to obtain associated operating signals;
    (b) operating the automatic transmission at a base line pressure, the base line pressure having a value based on the vehicle operating signals;
    (c) decreasing the line pressure from the base pressure to allow for a small slip within a predetermined range across a weakest load carrying friction element;
    (d) increasing the line pressure to obtain a temporary pressure at which the weakest load carrying friction element is no longer slipping;
    (e) increasing the line pressure from the temporary pressure to obtain an operating line pressure, the operating line pressure providing the weakest load carrying friction element with additional capacity for transmitting torque without slipping for sensed throttle position signals within a predefined hysteresis band having an upper threshold and a lower threshold;
    (f) increasing the line pressure if the throttle position signal exceeds the upper threshold to a new line pressure at which the weakest load carrying friction element is not slipping;
    (g) decreasing the line pressure from the new line pressure to allow for a small slip within a predetermined range across the weakest load carrying friction element; and
    (h) repeating steps (a)–(g) periodically during vehicle operation.

7. The method of claim 6 wherein the line pressure is adaptively increased to the new line pressure, the new line pressure being obtained from a table of line pressure values stored in a non-volatile memory of the control unit, the table values based on vehicle throttle position and transmission input torque.

8. The method of claim 6 further comprising decreasing the line pressure from the operating pressure to allow for a small slip within a predetermined range across the weakest load carrying friction element if the sensed throttle position is decreased below the lower limit of the hysteresis band, thereby increasing the efficiency of the transmission.

9. The method of claim 8 further comprising increasing the line pressure until there is no slip to obtain a new temporary pressure at which the weakest load carrying friction element is no longer slipping; and increasing the line pressure from the new temporary pressure to obtain a new operating line pressure, the new operating line pressure providing the weakest load carrying friction element with additional capacity for transmitting torque without slipping for sensed vehicle throttle positions within the hysteresis band.

10. The method of claim 6 wherein the step of decreasing the line pressure to allow for incipient slip includes the step of controlling a solenoid according to:

$$PC_n = PC_p + (E_o - E_1)*K_p + (E_o - 2*E_1 + E_2)*K_d + E_o*K_i$$

wherein $PC_n$ is the solenoid control signal, $PC_p$ represents a previous value of the solenoid control signal, $E_0$ is the present friction element slip error determined from a desired friction element slip and the actual friction element slip, $E_1$ is the previous friction element slip error, $E_2$ is the second previous friction element slip error and $K_p$, $K_i$ and $K_d$ are controller constants.

11. An apparatus, for use in a vehicle including an automatic transmission having a plurality of load carrying friction elements, for optimizing a line pressure in the automatic transmission, the apparatus comprising:
  means for decreasing the line pressure from a predetermined base pressure to allow for a small slip within a predetermined range across the weakest load carrying friction element;
  means for increasing the line pressure to obtain a temporary pressure at which a weakest load carrying friction element is no longer slipping; and
  means for increasing the line pressure from the temporary pressure to obtain an operating line pressure, the operating line pressure providing the weakest load carrying friction element with additional capacity for transmitting torque without slipping during changes in vehicle throttle position within a predefined hysteresis band having an upper threshold and a lower threshold.

12. The apparatus of 11 further comprising means for increasing the line pressure, if the throttle position exceeds the upper limit of the hysteresis band, to a new line pressure at which the weakest load carrying friction element is not slipping.

13. The apparatus claim 12 further comprising means for decreasing the line pressure from the new line pressure to allow for a small slip within a predetermined range across the weakest load carrying friction element.

14. The apparatus of claim 12 wherein the line pressure is adaptively increased to the new line pressure, the new line pressure being based on vehicle throttle position and transmission input torque.

15. The apparatus of claim 11 further comprising means for decreasing the line pressure, from the operating pressure to allow for a small slip within a predetermined range across the weakest load carrying friction element, if the sensed throttle position is decreased below the lower limit of the hysteresis band, thereby increasing the efficiency of the transmission.

16. The apparatus of claim 11 further comprising sensing means for sensing a plurality of vehicle operating parameters including vehicle throttle position; and
  means for operating the transmission at a base line pressure, the base line pressure having a value based on the vehicle operating parameters.

* * * * *